United States Patent [19]

Pelish

[11] 4,197,833
[45] Apr. 15, 1980

[54] SOLAR COLLECTOR SYSTEM USING SLATE ABSORBER PANELS

[76] Inventor: James D. Pelish, Box 165, West Park, N.Y. 12493

[21] Appl. No.: 873,127

[22] Filed: Jan. 30, 1978

[51] Int. Cl.$^2$ .............................................. F24J 3/02
[52] U.S. Cl. ..................................................... 126/432
[58] Field of Search ............... 126/270, 271; 237/1 A; 52/521, 547

[56] References Cited

U.S. PATENT DOCUMENTS

| | | | |
|---|---|---|---|
| 2,660,863 | 12/1953 | Gerhart, Jr. | 126/271 |
| 3,387,602 | 6/1968 | Thomason | 126/271 |
| 4,018,211 | 4/1977 | Barr | 126/271 |
| 4,086,912 | 5/1978 | Freeman | 126/271 |

*Primary Examiner*—James C. Yeung
*Attorney, Agent, or Firm*—Spellman, Joel & Pelton

[57] ABSTRACT

A solar collector system comprises one or more slate absorber panels each including a series of heat collecting slate members arranged in a shingle-like closed assembly over which water is designed to flow for heating by solar energy. The system includes a trickle pipe mounted at one end of the sloped assembly so that water flows therefrom onto a copper plate having a baffle at one end and then onto the first of a series of slate members where the water is heated by the sun and finally flows into a collecting trough at the other end which also includes an outlet for the water. The assembly including the slate members is mounted within an aluminum jacket having a base and upwardly extending side portions to the ends of which closure members are mounted. Copper side channels of a particular configuration are mounted along both sides of each panel in a manner to provide improved sealing, particularly where a number of panels are to be ganged together. The base of the panel comprises a set thickness of rigid insulation supported by the aluminum jacket. The upper portion of the panel comprises a double insulated glass panel held in place by side frame members which engage the upwardly extending side portions of the jacket. The panels are mounted together in a system by means of rigid side frame members which are coupled together so that the slate absorber panels or cells can be ganged together in a predetermined arrangement.

2 Claims, 3 Drawing Figures

SOLAR COLLECTOR SYSTEM USING SLATE ABSORBER PANELS

BACKGROUND OF THE INVENTION AND THE PRIOR ART

This invention relates to solar collector systems and in particular, to a new and improved slate absorber panel arrangement.

The prior art, as revealed by a search, includes a considerable number of recent references due to the current interest in utilizing solar energy. U.S. Pat. No. 4,018,211 to I. R. Barr, discloses a solar energy collection system utilizing an insulating light-transmitting honeycomb sandwich array having dark, honeycomb walls and bottom surface for solar energy absorption and transfer to a fluid. U.S. Pat. No. 4,033,118 to W. R. Powell, discloses a solar energy receiver utilizing a paraboloid mirror to concentrate the rays of the sun and direct them into a recessed portion of a collector to heat a fluid. U.S. Pat. No. 4,033,325 to J. E. Walker, discloses an assembly which contains an internal collector fluid circulating through a closed loop over an energy absorber surface to transmit the thermal energy through a selfcontained heat exchanger to external devices. None of the above prior art patents disclose the particular structural arrangement of applicant's invention nor the use of slate in a solar collector panel.

U.S. Pat. No. 4,030,478 to E. R. Beaver, Jr., discloses a particular closed, circuitous solar energy absorbing pathway in a solar collector. U.S. Pat. No. 3,513,828 to W. F. Masters, discloses a solar water heater comprising three superimposed sheets with a space between the central and top sheet being filled with air and a fluid being introduced between the base and the central sheet for heat exchange purposes.

Further, U.S. Pat. No. 3,989,032 to H. Harrison, discloses a system for solar heating of water in combination with a domestic hot water system having a heat exchange passage for water and an inflatable elastic plastic member extending substantially the entire length of the collector passage. Means are provided to maintain air within the inflatable member at a higher hydrostatic air pressure so that the collector is rendered tolerant to freezing. Finally, U.S. Pat. No. 3,910,253 to Thomason et al is directed to a flat rod solar heated building having a shallow pond type collector overhanging the building.

In contrast to the prior art disclosed above, the present invention discloses a slate absorbent panel system which is sturdy, highly efficient and possesses long life characteristics. The structural arrangement is such that the panels may be readily ganged together to provide a multiple panel arrangement. None of the references disclose the shingle-like arrangement of slate members in a unique frame as disclosed hereinafter.

SUMMARY OF THE INVENTION

The present invention pertains to a new and improved slate absorber panel utilized in a solar collector system. The panel comprises a shingle-like array of slate panels mounted in a rigid metal frame so that water may be heated by solar energy as it flows over the slates. Since the slate has a high heating content, a smaller area of collectors is required and a higher volume of water can be employed to obtain the same degree of heat transfer. The panel is generally mounted in a sloped configuration on a surface exposed to the sun and includes a trickle pipe at the upper end having a plurality of perforations to provide an input of water, a copper baffle plate onto which the water flows and a baffle at the end of the baffle plate. The panel includes copper troughs or side panels mounted along the sides and held into position by the upwardly extending side portions of the panel jacket relationship. The water flows over the slate members into a copper collecting trough and then through an outlet where it may be recirculated if desired or used directly for heating purposes. The base of the panel comprises a predetermined quantity of rigid insulation mounted on the aluminum jacket. The upper portion of the panel comprises a double insulated glass panel held in place by the side frame members which engage the side portions of the jacket.

Accordingly, it is an object of this invention to provide new and improved solar collector systems using slate absorber panels.

Another object of this invention is to provide a new and improved solar collector system utilizing slate panels which may be readily ganged together in an adjacent relationship to provide a predetermined amount of heating.

A more specific object of this invention is to provide a highly efficient solar collector system utilizing slate absorber members which are mounted within a rigid frame in a shingle-like leak-proof assembly over which a heat conducting medium flows.

DESCRIPTION OF THE DRAWINGS

Other objects and advantages of the present invention will be more clearly seen when viewed in conjunction with the accompanying drawings wherein.

DETAILED DESCRIPTION OF THE INVENTION

Figure 1:
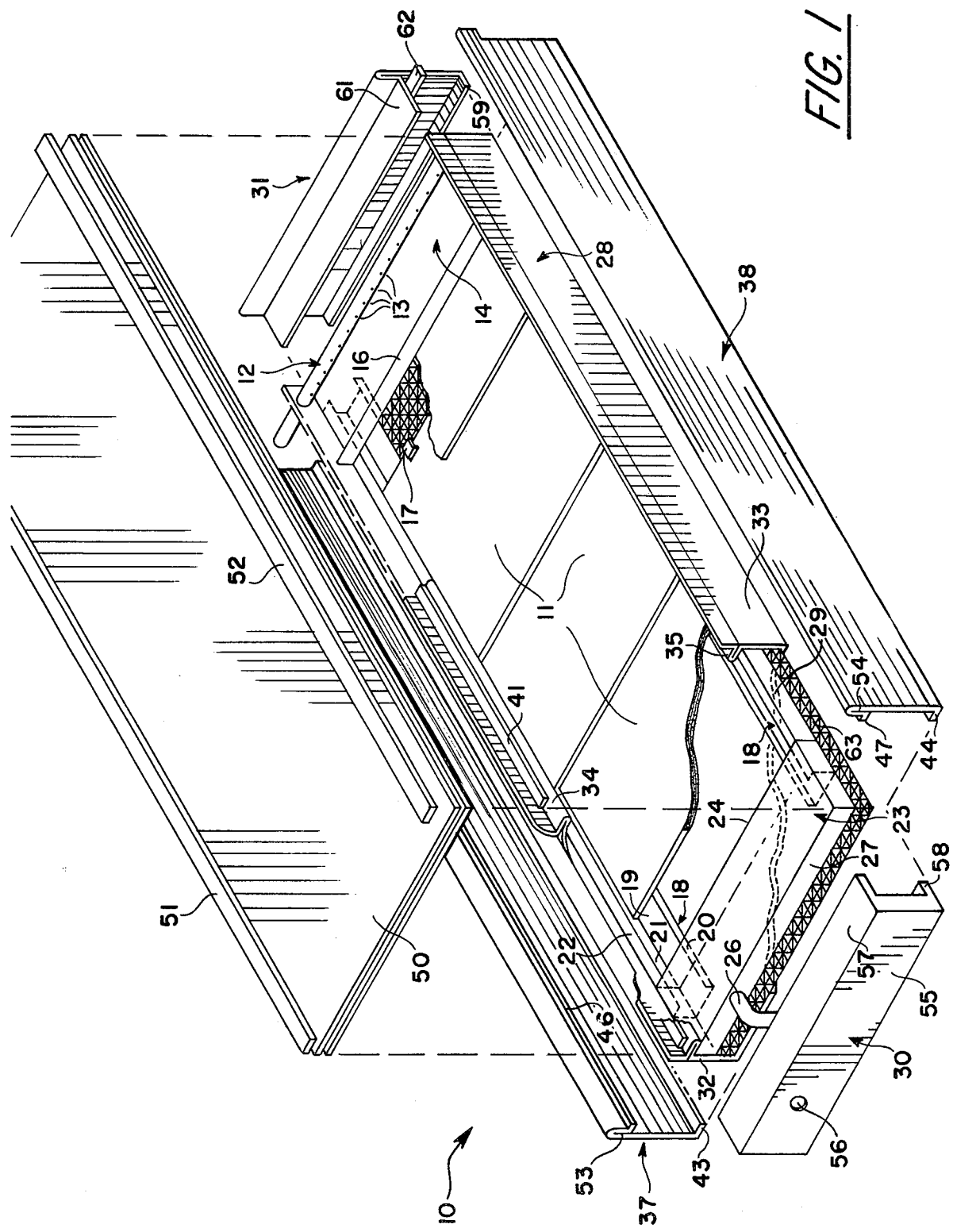
FIG. 1 is an exploded perspective view of the slate absorber panel.
Figure 2:
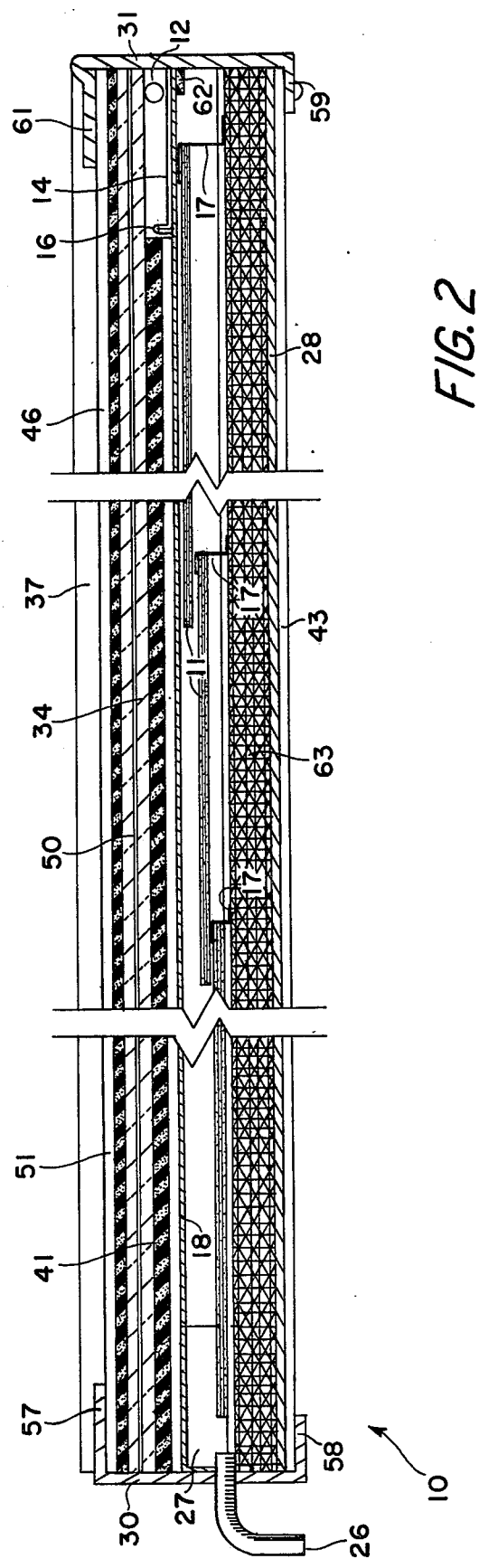
FIG. 2 is a cross-sectional view of slate absorber panel of the present invention.
Figure 3:
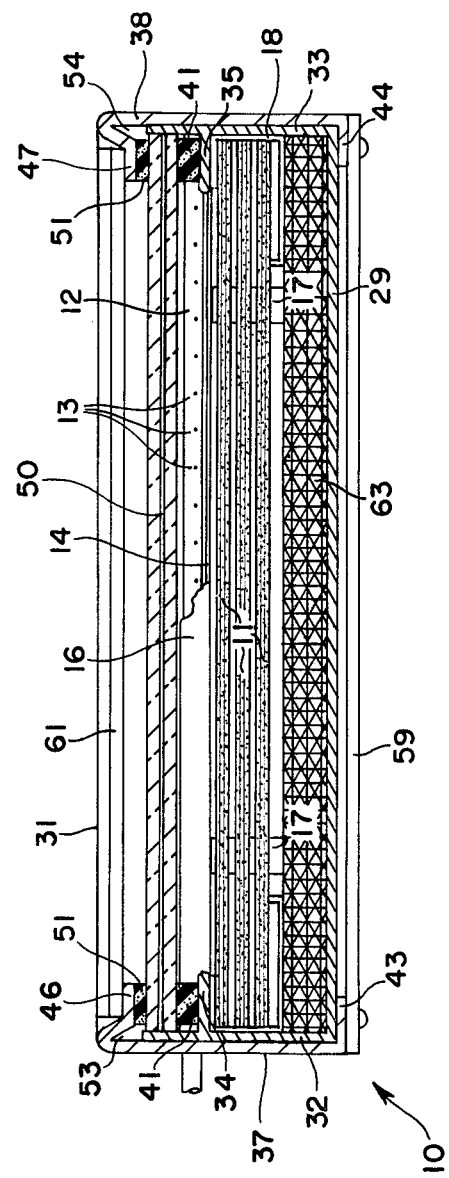
FIG. 3 is a view taken along the 3—3 of FIG. 2 to illustrate various details of the invention.

Referring now to FIG. 1 of the drawings, the invention comprises a solar collector system utilizing one or more slate absorber panels 10. The panels 10 each include a series of heat collecting slate members 11 arranged in a shingle-like arrangement within a closed assembly. The panel 10 is generally mounted in a sloped position with respect to the horizontal facing the sun for maximum exposure. The upper end of the panel assembly 10 includes a trickle pipe 12 which serves as the input for a stream of water which flows over the slate members 11. The trickle pipe extends transversely across the panel 10 and includes a plurality of perforations 13 through which water flows onto a copper baffle plate 14 having a weir 16 mounted transversely at the downstream end thereof. The slate members 11 are held in position by copper clips 17 of a predetermined configuration. The slate members are preferably 12 inch rectangular members of dark slate.

The assembly 10 includes copper side channels 18 each of which include a base 19 and upwardly extending walls 20 and 21, the latter wall extending along the outer edge of the assembly and having an upper portion 22 extending inwardly therefrom for a predetermined length. The side channels are arranged along the sides of the panel 10 in order to assure a water tight assembly as the water flows over the slate members 11 into a collecting trough 23 at the lower end of the panel. The trough 23 comprises a boxlike assembly which is open at one end 24 and has side channels 18 projecting into the opening 24 along with the lower portion of the end slate 11. An outlet pipe 26 extends through the wall 27 of the trough 23 so that the collected water may be recirculated or directly used for heating purposes as determined.

The panel 10 includes an aluminum jacket 28 having a base 29 and upwardly extending side portions 32 and 33. The side portions 32 and 33 each include an integrally formed upper portion 34 and 35 respectively extending inwardly at a predetermined distance below the top thereof. The inwardly projecting portions 34 and 35 are designed to engage the upper portion 22 of the side channels 18 to lock them in place. An elongated neoprene sealing member 41 is positioned along the upper surface of each inwardly projecting portion 34 or 35. Side panels 37 and 38 are mounded over the side portions 32 and 33, respectively, to seal the panel 10 while end caps 30 and 31 are mounted at the ends of the panel 10. Each side panel 37, 38 includes an inwardly extending flange 43 and 44 at its base which engages the base 29 of the panel jacket 28 and an upper portion which is folded back upon itself and includes an inwardly projecting flange 46, 47.

The flanges 46 and 47 engage the elongated neoprene strips 51, 52 which are positioned along the side edges of the insulated glass panel 50 to sealingly lock the panel 50 in place within the assembly 10. The folded-back upper portions of the side panels 37 and 38 form recesses 53 and 54 which are engaged by the upper portions of the side frames 32 and 33 thus forming a locking arrangement.

The end cap 30 comprises an end wall 55 having an aperture 56 therethrough for the outlet pipe 26 and inwardly projecting upper and lower portions 57 and 58. The other end cap 31 at the baffle plate end includes a lower inwardly projecting shelf 59 and an upper inwardly projecting shelf 61. The shelf 61 engages a neoprene seal 62 which rests upon the glass panel 50.

The slate panels 11, which are generally of a dark color such as black for heating purposes are supported by clips 17 which are of a substantially "Z-shaped" cross-section and are secured at their lower end to a sheet 63 of insulation of a predetermined thickness. The slate panels "are preferably about 3/16 inches in thickness and overlap about 1½ to 2 inches in the shingle-like arrangement within the assembly 10.

The assembly 10 comprising the solar collector system is generally mounted at an angle facing the sun with the baffle plate 14 at the upper end. Water is introduced through the trickle pipe 12 onto the baffle plate 14 and follows downward over the slate members 11 which attract the sun's rays through glass panel 50. The water is heated as it flows to the collecting trough 27 through the use of the highly effective slate members 11. Then the water flows through the pipe 26 to be used for heat exchange purposes or recirculated as desired.

The baffle plate weir 16 attempts to distribute the flow of water evenly over the slates 11 while any water which flows towards the side edges is caught by the side channels 18 to prevent leakage. The side frame members 37 and 38 and end caps 30 and 31 also cooperate to effect a readily-assembled sealed arrangement of the glass panel 50 to the jacket 28. Thus the solar heating system of the present invention comprises a highly efficient, inexpensive and simple arrangement wherein a number of panels 10 may be ganged together by merely fastening the side frame members 37 and 38 of adjacent panels 10. As a further advantage, the inexpensive slate components 11 of the assembly for outlast metal collectors since corrosion problems are eliminated.

While the invention has been explained by a detail description of certain specific embodiments, it is understood that various modifications and substitutions can be made in any of them within the scope of the appended claims which are intended also to include equivalents of such embodiments.

I claim:

1. A solar collector system comprising:
 a frame having a base, upwardly extending side portions and end caps,
 a plurality of slate absorber members mounted within the frame in a shingle-like overlapping assembly,
 a glass panel mounted to the upwardly extending portions of the side frame and to the end caps mounted at either end of the frame,
 a side frame member adapted to fit over each of the upwardly extending side portions and hold the glass panel in place, said side frame members comprising a lower flange which engages the base of the frame and an inwardly projecting flange at the upper portion thereof which engages and holds the glass panel in place,
 a pair of side channels each mounted along a respective internal side of the frame in engagement with the side portions thereof, said side panels preventing leaking of the fluid by feeding it to the collector,
 means for introducing a fluid onto the outermost slate panel at one end wherein the fluid flows downwardly over the overlapping slate members and is heated thereby, and,
 a collector at the other end for receiving the heated fluid after it flows over the slate members.

2. A solar collector system comprising:
 a frame having a base, upwardly extending side portions having side channels mounted along the interior walls of the frame side portions and extending into the collector and end caps,
 a plurality of slate absorber members mounted within the frame in shingle-like overlapping assembly, said slate members being of dark slate and mounted with the edges of adjacent slates overlapping for a distance,
 means for introducing a fluid onto the outermost slate panel at one end wherein the fluid flows downwardly over the overlapping slate members and is heated thereby, and, a collector at the other end for receiving the heated fluid after it flows over the slate members.

* * * * *